(12) United States Patent
Gioscia

(10) Patent No.: US 6,630,811 B1
(45) Date of Patent: Oct. 7, 2003

(54) FLIP COVER WITH BATTERY FOR PORTABLE COMPUTER SYSTEM

(75) Inventor: Rich Gioscia, Santa Clara, CA (US)

(73) Assignee: Palm, Inc., Santa Clara, CA (US)

(*) Notice: Subject to any disclaimer, the term of this patent is extended or adjusted under 35 U.S.C. 154(b) by 0 days.

(21) Appl. No.: 09/815,402

(22) Filed: Mar. 22, 2001

(51) Int. Cl.⁷ .................................................. H02J 7/00
(52) U.S. Cl. ...................................................... 320/107
(58) Field of Search ................................. 320/101, 107; 455/11.1, 556, 557, 569

(56) References Cited

U.S. PATENT DOCUMENTS

| | | | |
|---|---|---|---|
| 5,886,688 A | * 3/1999 | Fifield et al. | 345/206 |
| 5,983,073 A | * 11/1999 | Ditzik | 455/11.1 |
| 6,339,311 B1 | * 11/2000 | Caldwell | 320/101 |

* cited by examiner

Primary Examiner—Edward H. Tso
Assistant Examiner—Pia Tibbits
(74) Attorney, Agent, or Firm—Wagner Murabito & Hao LLP

(57) ABSTRACT

An apparatus for providing an energy source for portable computer systems. In one embodiment, the present invention is comprised of a front flip cover having integrated therewithin a flat rechargeable battery. The front flip cover is adapted to be removably attached to a portable computer system. In the present embodiment, the front flip cover includes a hinge. The front flip cover further has a first electrical connector coupled to the hinge. The front flip cover further has a second electrical connector coupled to the front flip cover. A renewable energy source or battery is coupled with the front flip cover and is disposed integral of the front flip cover. The renewable energy source or battery provides operating power to the portable computer system. In one embodiment, the flip cover also has a communication port attached thereto for allowing synchronization and recharging functions when inserted into a cradle.

32 Claims, 14 Drawing Sheets

FLIP COVER WITH BATTERY FOR PORTABLE COMPUTER SYSTEM

FIELD OF THE INVENTION

The present invention relates to battery power implemented in a portable computer system. More particularly, the present invention provides an apparatus which provides a battery source integral to a front flip cover of a hand-held computer.

BACKGROUND OF THE INVENTION

As the continuing advances in technology have enabled the further miniaturization of the components required to build computer systems, new categories of computer systems have been created. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like. Many corporations have developed and are currently marketing their individual PDAs.

A palmtop computer system is a computer that is small enough to be held in the users hand and as such is "palm-sized." As a result, palmtops are readily carried about in the users briefcase, purse, and in some instances, in the user's pocket. By virtue of its size, the palmtop computer, being inherently lightweight, is therefore exceptionally portable and convenient.

Because of the continuing miniaturization of computer systems and their related components, users of today's portable computers can now carry, in their briefcase, purse, or even their pocket, very powerful computers. These portable computers are able to perform many computer related tasks that, until recently, were reserved for workstation and desktop computers. Additionally, some of the newer portable computer systems are now available with color displays. As should be realized, this increase in processing and display capabilities requires additional power to perform these tasks.

In one attempt to provide additional power, the portable computer system was designed to use non-rechargeable batteries, analogous to a battery operated cassette or CD player. One advantage was that the batteries were user serviceable, meaning the user could easily replace them when they became discharged.

While this solution provided portable power to the computer system, it was not without drawbacks. One drawback was that, during periods of heavy use, the batteries would require frequent replacement. As such, another drawback was that users would have to carry multiple sets of extra batteries to ensure usability. An additional drawback to using non-rechargeable batteries is that the size and shape of the batteries dictated, in part, the size and shape of the portable computer in which they would be used.

In one example, one battery commonly used in portable computers, an AAA sized battery, has a diameter of approximately ten millimeters, which is a relatively small diameter. However, when compared to the thickness of the portable computer which is approximately thirteen millimeters, this battery accounts for nearly 77% of the required thickness of the portable computer in which it is used.

In another attempt to provide power, the portable computer system was designed to use rechargeable batteries. While rechargeable batteries eliminated the need for a user to carry extra batteries, the rechargeable batteries were still about the same size and dimension as the replaceable batteries thereby having some of the same disadvantages described above.

Another such drawback was that the rechargeable batteries were not user serviceable in some devices, because they were inside the device. As a result, if the rechargeable batteries were no longer able to hold a charge, the entire portable computer system would need to be returned to the manufacturer for servicing, which could take days or weeks, and as such, would be highly inconvenient to the user.

SUMMARY OF THE INVENTION

Thus, a need exists for an apparatus that provides a renewable energy source for portable computer systems. Another need exists for an apparatus that fills the above need and which provides user serviceability in a convenient and seamless manner. Additionally, a need exists for an apparatus than fills the above needs and which provides recharging of the renewable energy source while retaining operational functionality of the portable computer system.

These and other objects and advantages of the present invention will, no doubt, become obvious to those of ordinary skill in the art after having read the following detailed description of the preferred embodiments which are illustrated in the various drawing figures.

Accordingly, embodiments of the present invention are drawn to an apparatus that provides a renewable energy source for portable computer systems. The present invention further provides an apparatus that achieves the above listed accomplishment and which provides user serviceability of the renewable energy source in a convenient and seamless manner. Furthermore, the present invention also provides an apparatus that achieves the above listed accomplishments and which also provides recharging of the renewable energy source while retaining operational functionality of the portable computer system.

The present invention provides an apparatus that provides a renewable energy source for portable computer systems. In one embodiment, the present invention is comprised of a front flip cover. The front flip cover is adapted to be attached to a portable computer system. In the present embodiment, the front flip cover includes a hinge. The front flip cover further includes a first electrical connector coupled to the hinge. The front flip cover further includes a renewable energy source. The renewable energy source is integrated with the front flip cover. The renewable energy source provides operating power to the portable computer system, whether implemented as a primary energy source or as a supplemental energy source. Further, by incorporating the energy source into the dimensions of the front flip cover, a substantial increase in energy storage capacity is realized as well as reducing the frequency of recharging.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus for providing a front flip cover having an integral flat battery to be utilized in a portable computer system is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a portable computer system, such as a palmtop or personal digital assistant. However, it is appreciated that the present invention can be used with other types of devices that have the capability to utilize battery power to provide operational functionality, including but not limited to palmtop computer systems.

Exemplary Handheld Platform

Figure 1A:
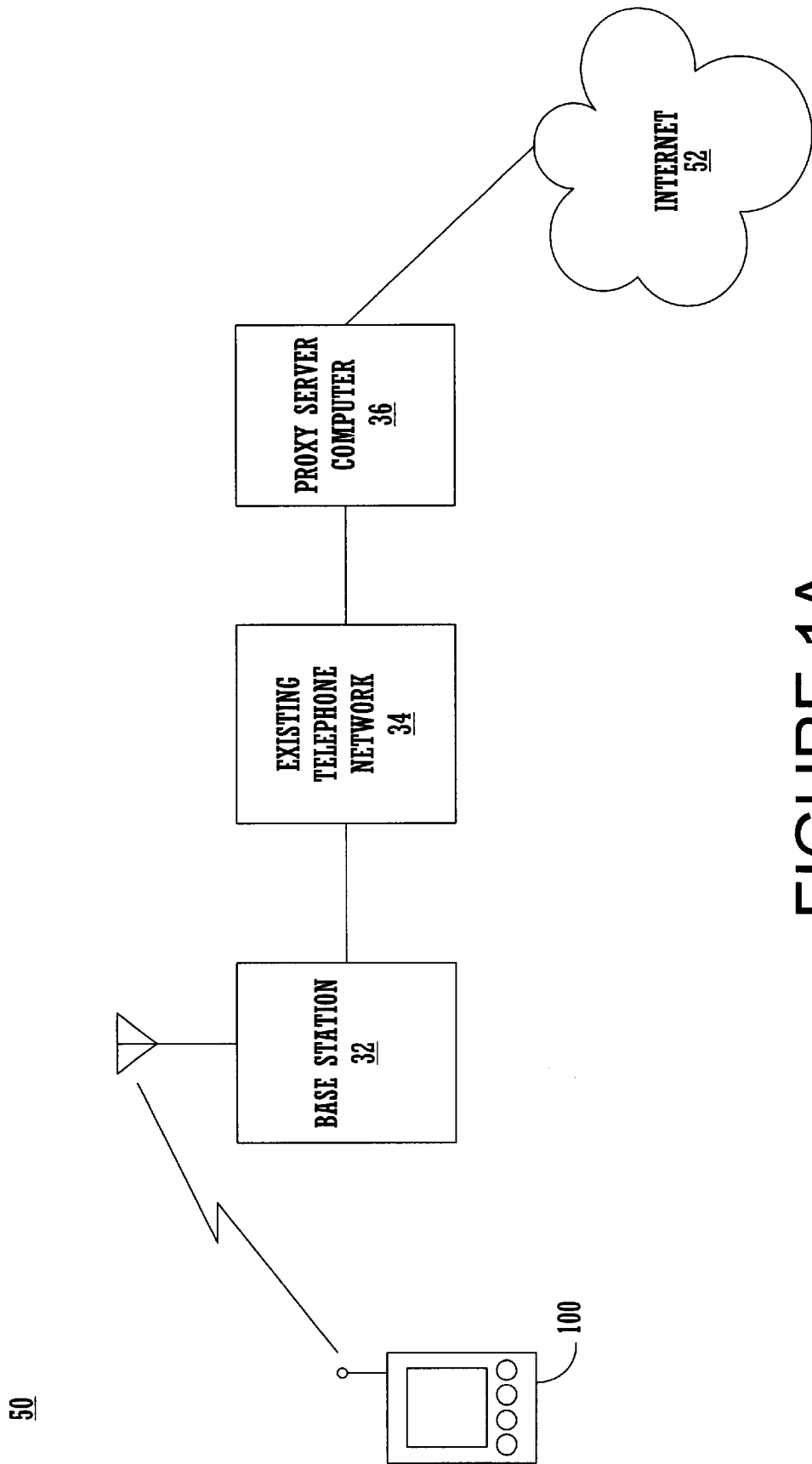
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices which may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) and WML (Wireless Markup Language) can be used by portable computer system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 1A, the existing telephone network could also be a packet-based network utilized by some conventional portable computer systems. However, a wireless communication interface is utilized to communicate data and information between portable computer system 100 and base station 32. Furthermore, nearly any wireless network can support the functionality to be disclosed herein.

Figure 1B:
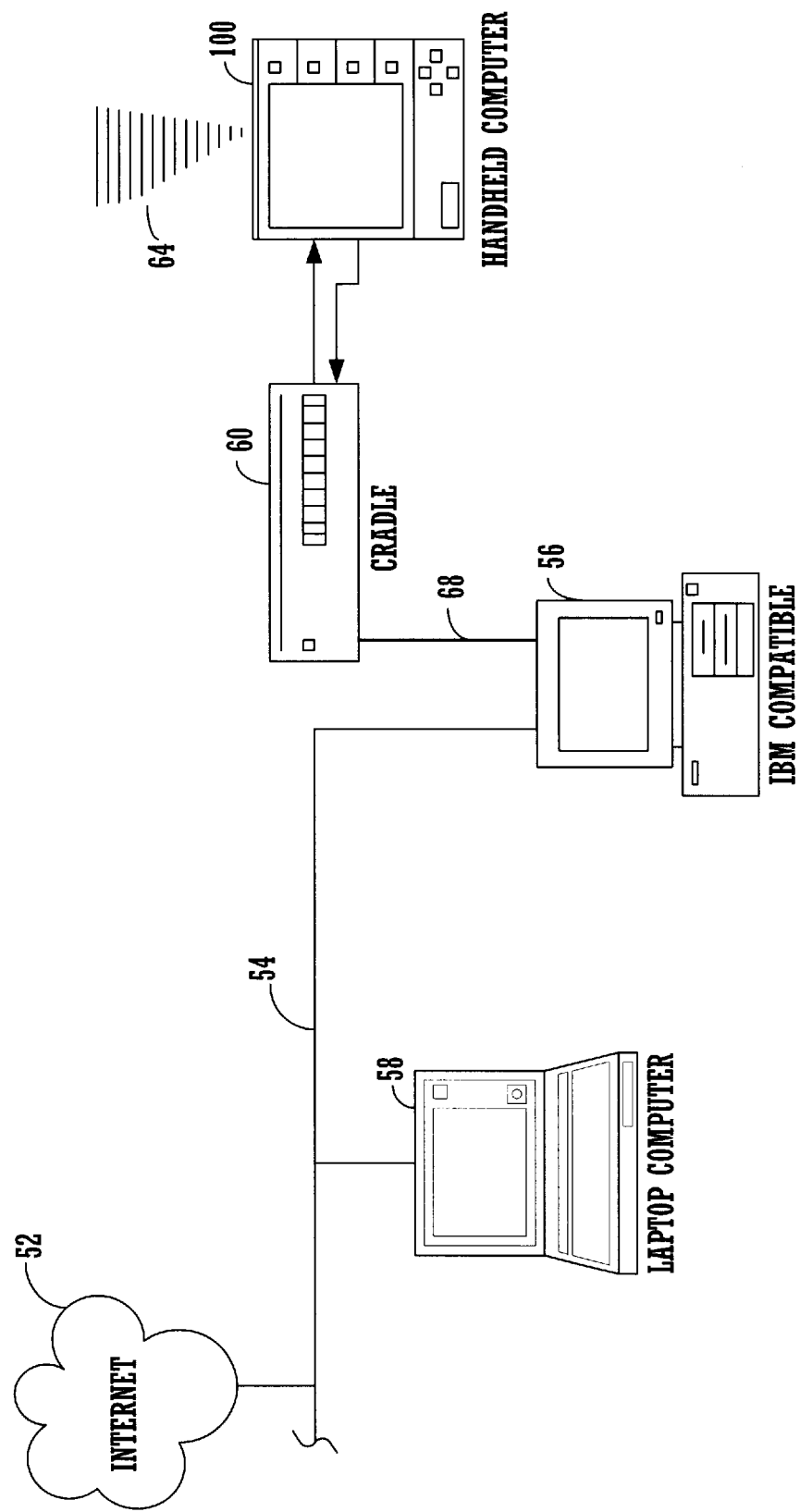
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 1B, the existing telephone network could also be a packet-based network utilized by some conventional portable computer systems.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
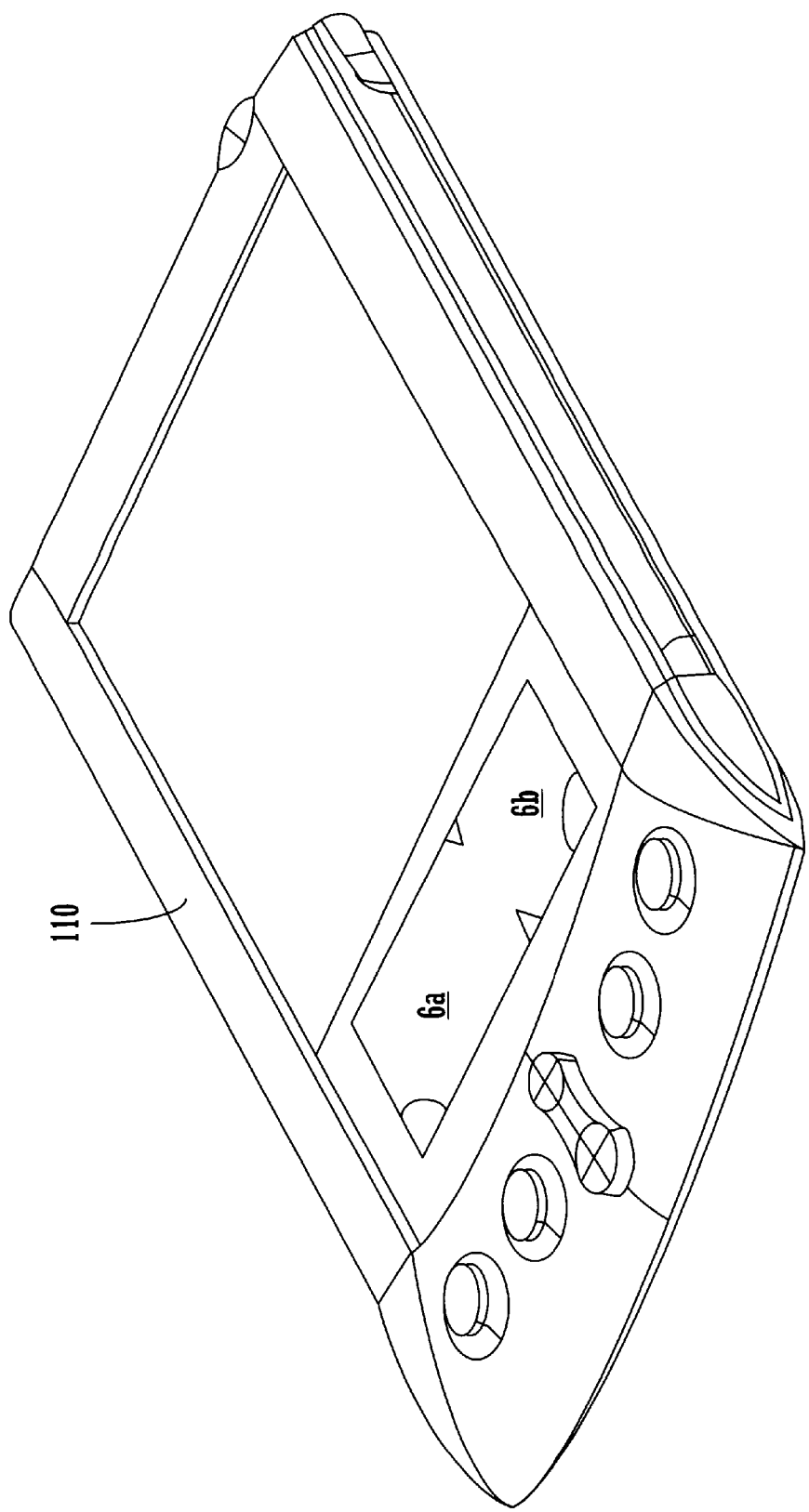
FIG. 2 is an illustrated front angle view of a portable computer system in which the present invention may be implemented in accordance with one embodiment of the present invention.

FIG. 2 shows a portable computer system 10 having a slot for receiving a front flip cover (not shown) in which the present invention may be implemented, in a front angled perspective view. It should be appreciated that in addition to using the front flip cover of the present invention for power, portable computer system 10 may be configured with internal rechargeable batteries which supply the necessary power.

Figure 3:
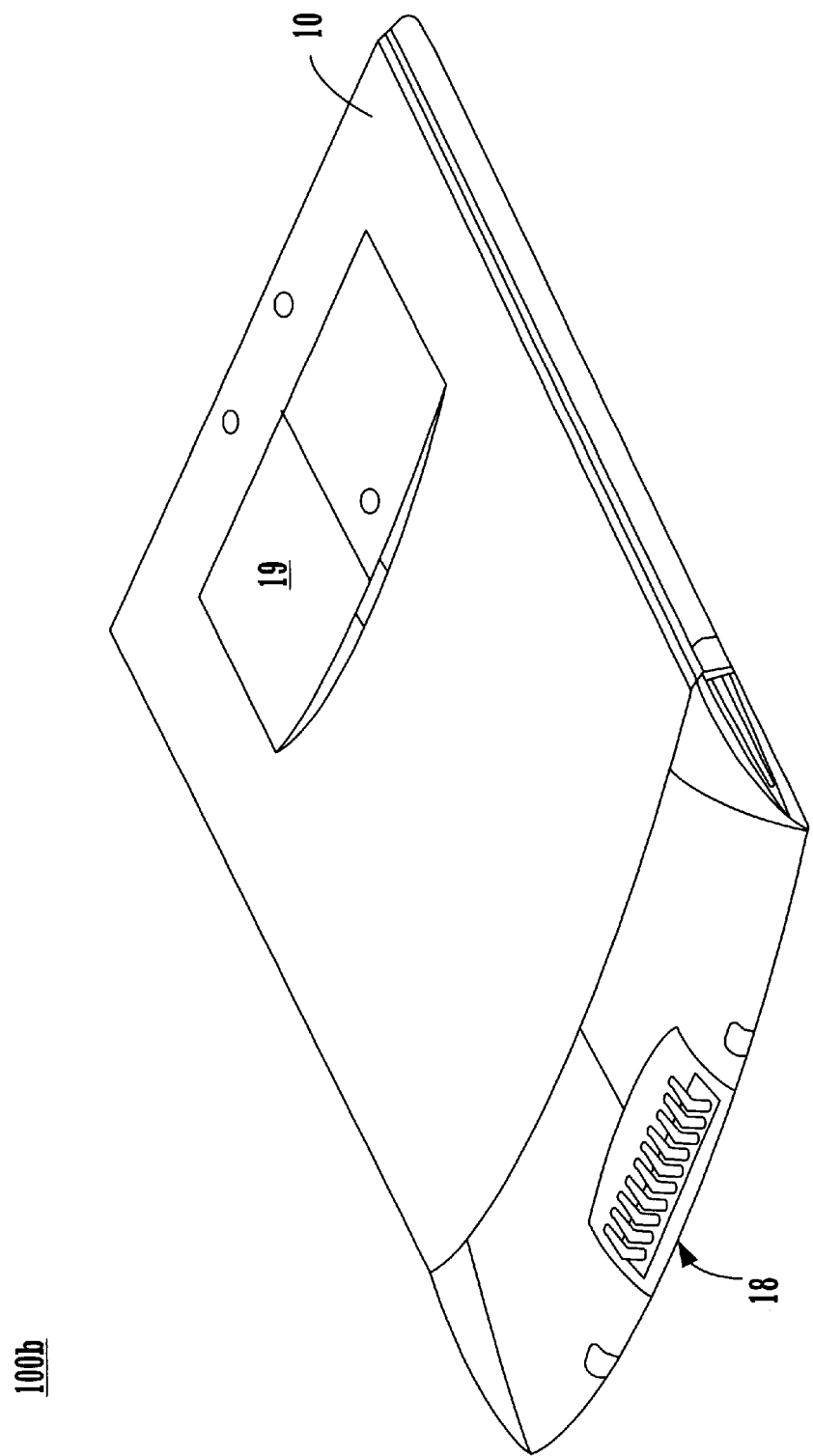
FIG. 3 is an illustrated rear-angled view of the portable computer system of FIG. 2.
Figure 9:
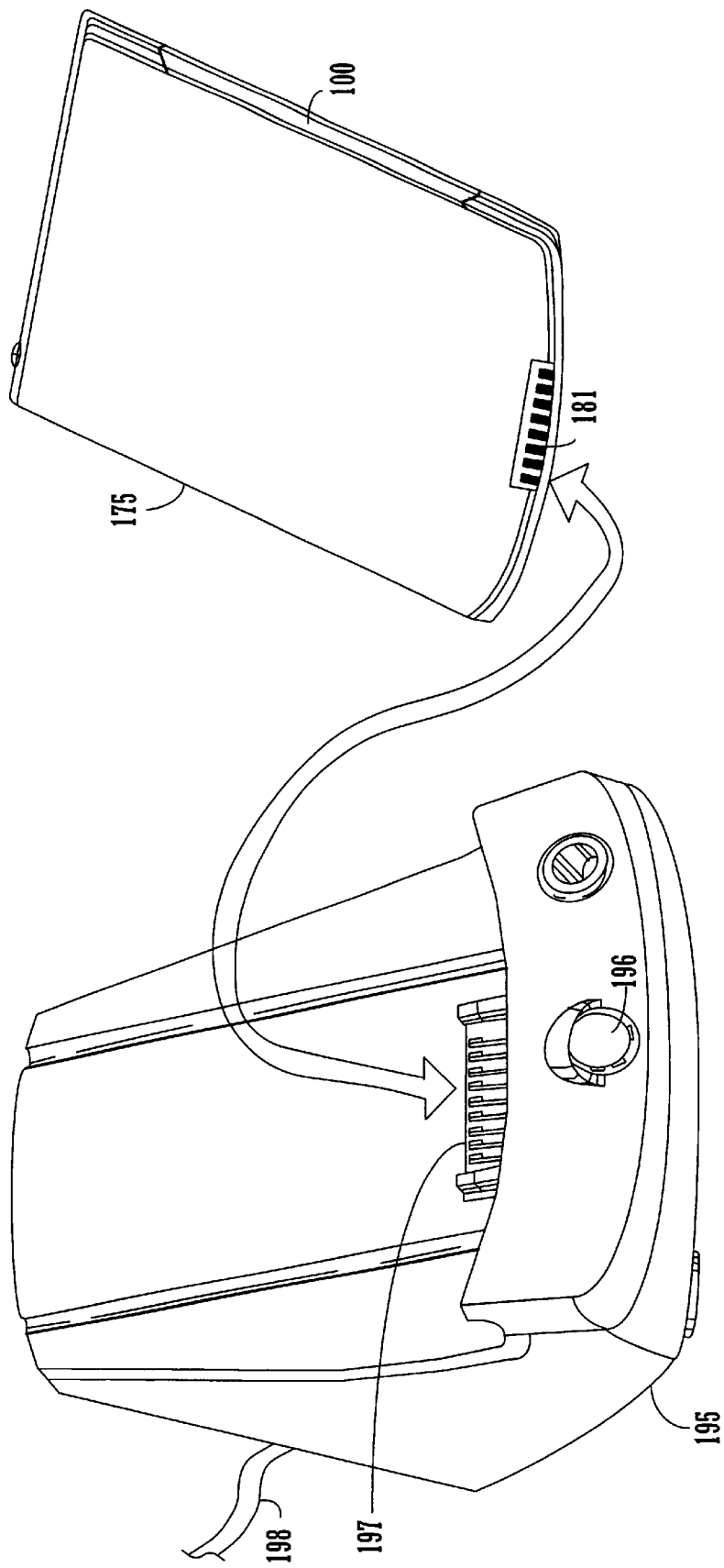
FIG. 9 is an illustrated front angled view of a portable computer system having a front flip cover being in a ready position to be coupled with a cradle, in accordance with one embodiment of the present invention.
Figure 10:
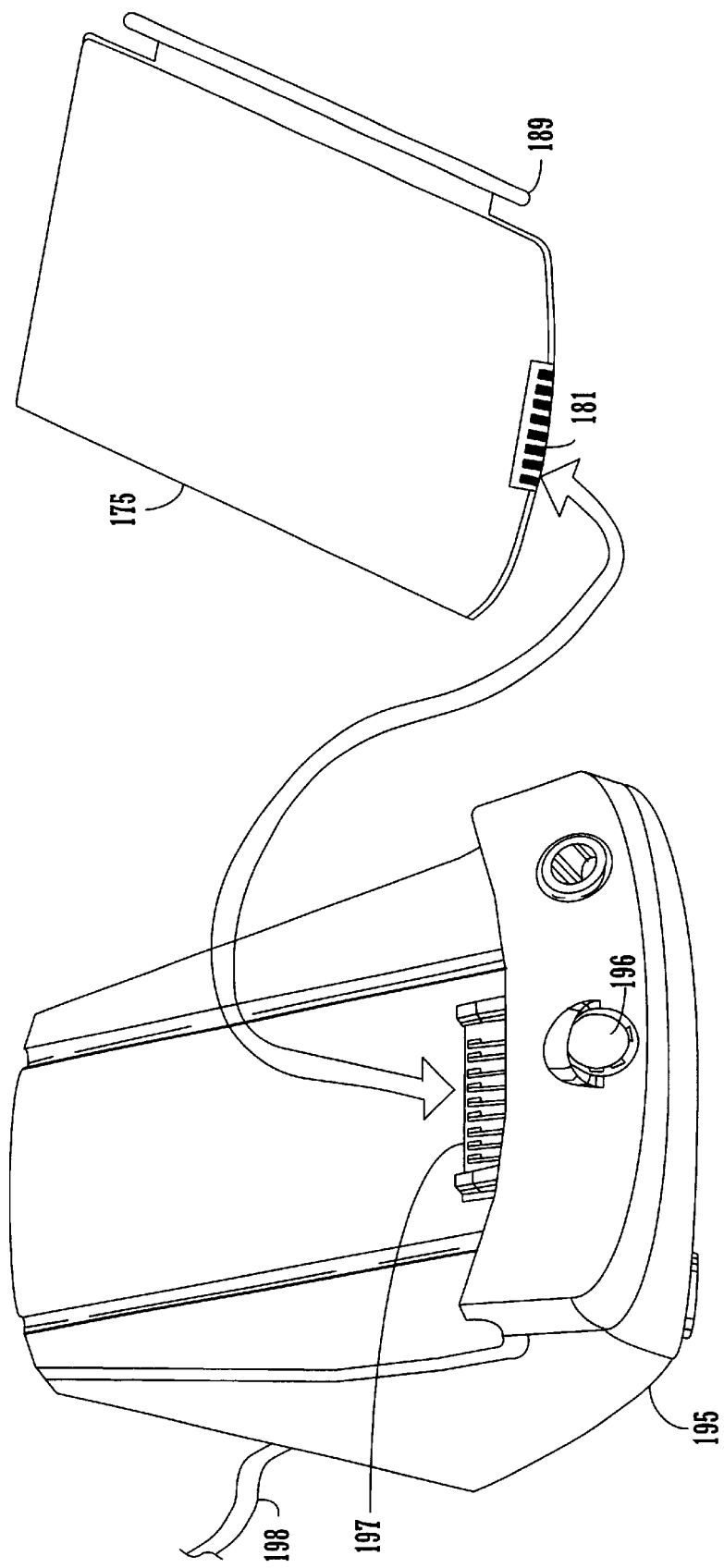
FIG. 10 is an illustrated front angled view of a front flip cover in a ready position to be coupled with a cradle, in accordance with one embodiment of the present invention.

FIG. 3 shows the portable computer system 10 of FIG. 2 in a rear angled perspective view. Internal battery access 19 is shown and which provides easy access to optional batteries when replacement is needed. Shown also is communication interface 18 which provides coupling enablement of portable computer system 10 to a docking cradle, as shown in FIG. 1B and FIGS. 9 and 10. In this example, communication interface 18 enables synchronization of portable computer system 10 with other computers.

The general process and results achieved through synchronization, e.g., "hot sync" are described in more detail in the following: U.S. Pat. No. 5,727,202 issued Mar. 10, 1998 by Kucala; U.S. Pat. No. 6,000,000 issued Dec. 7, 1999 by Hawkins et al.; U.S. Pat. No. 5,832,489 issued Nov. 3, 1999 by Kucala; U.S. Pat. No. 5,884,232 issued Mar. 16, 1999 by Hawkins et al.; and U.S. Pat. No. 6,006,274 issued Dec. 21, 1999 by Hawkins et al., all of which are hereby incorporated herein by reference.

It should be further appreciated that by relocating the internal batteries contained within portable computer system 10 to a front flip cover, a substantial reduction in the thickness of the portable computer system may be achieved.

Figure 4:
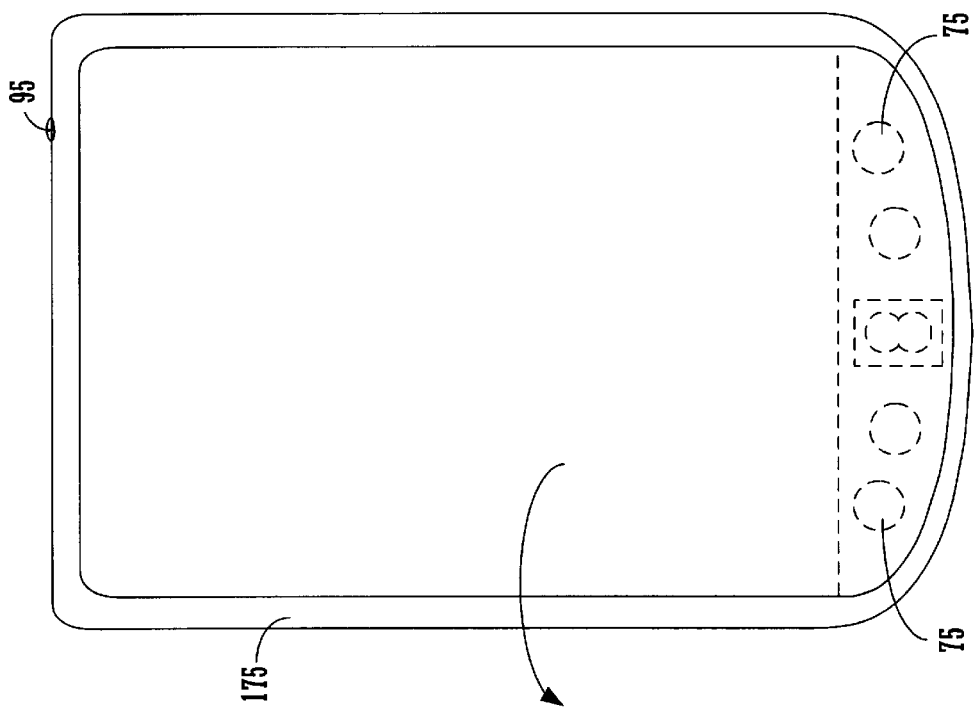
FIG. 4 is an illustrated front-facing view of a portable computer system which shows the front flip cover in a closed position, in accordance with one embodiment of the present invention.

FIG. 4 is an illustrated front view of portable computer system 100 equipped with front flip cover 175, in one embodiment of the present invention. According to the present invention, the front flip cover has integrated therewith a flat battery that may be rechargeable. In this illustration, front flip cover 175, adapted to be rotated about a hinge or axis, as indicated by the arrow, is in the closed position, thereby providing portable computer system 100 and cradle interface connector (FIG. 5) protection from incidental contact and possible damage. Disposed upon the top edge of portable computer system 100 is on/off button 95. Disposed toward the bottom of portable computer system 100 are function buttons 75, which are indicated by the dotted lines. It should be appreciated that the renewable energy source of the present embodiment is integrated into the front flip cover, and as such is not visible. It should be distinctly appreciated that front flip cover 175 is adapted to be removeably inserted into a front flip cover receiving slot 190, as shown in FIG. 6A.

Figure 5:
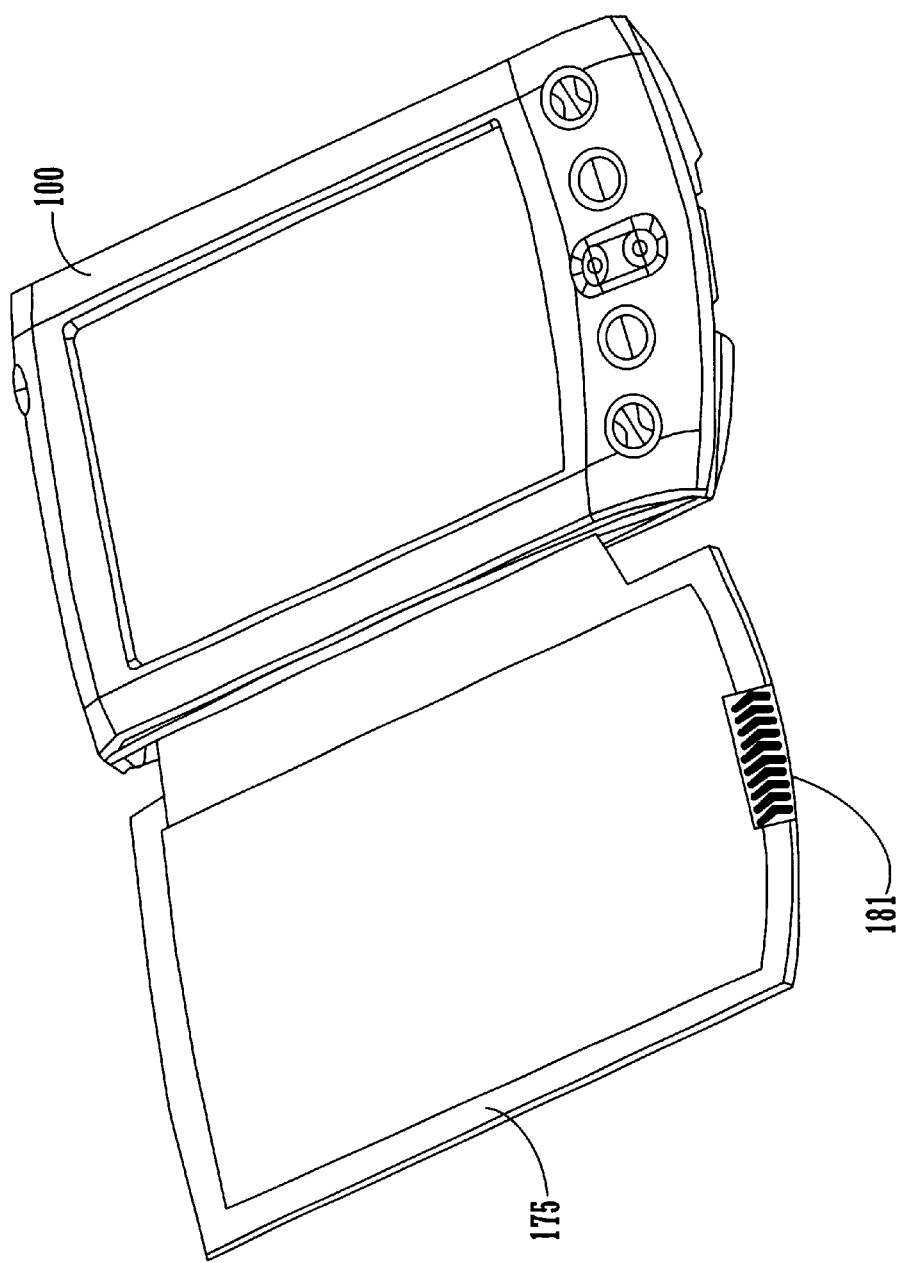
FIG. 5 is an illustrated front-facing view of the portable computer system of FIG. 4 which shows the front flip cover in an open position, in accordance with one embodiment of the present invention.

FIG. 5 is an illustrated front angled view of portable computer system 100 of FIG. 4. In this illustration of the present embodiment, front flip cover 175 is in an open position. Shown disposed near the bottom of the inside surface of front flip cover 175 is cradle interface connector 181. Cradle interface connector 181 provides the electrical and communicative coupling of front flip cover 175 with a docking cradle 195, so as to enable hot synching of portable computer system 100 and,also to enable the recharging of the renewable energy source disposed within front flip cover 175.

Figure 6:
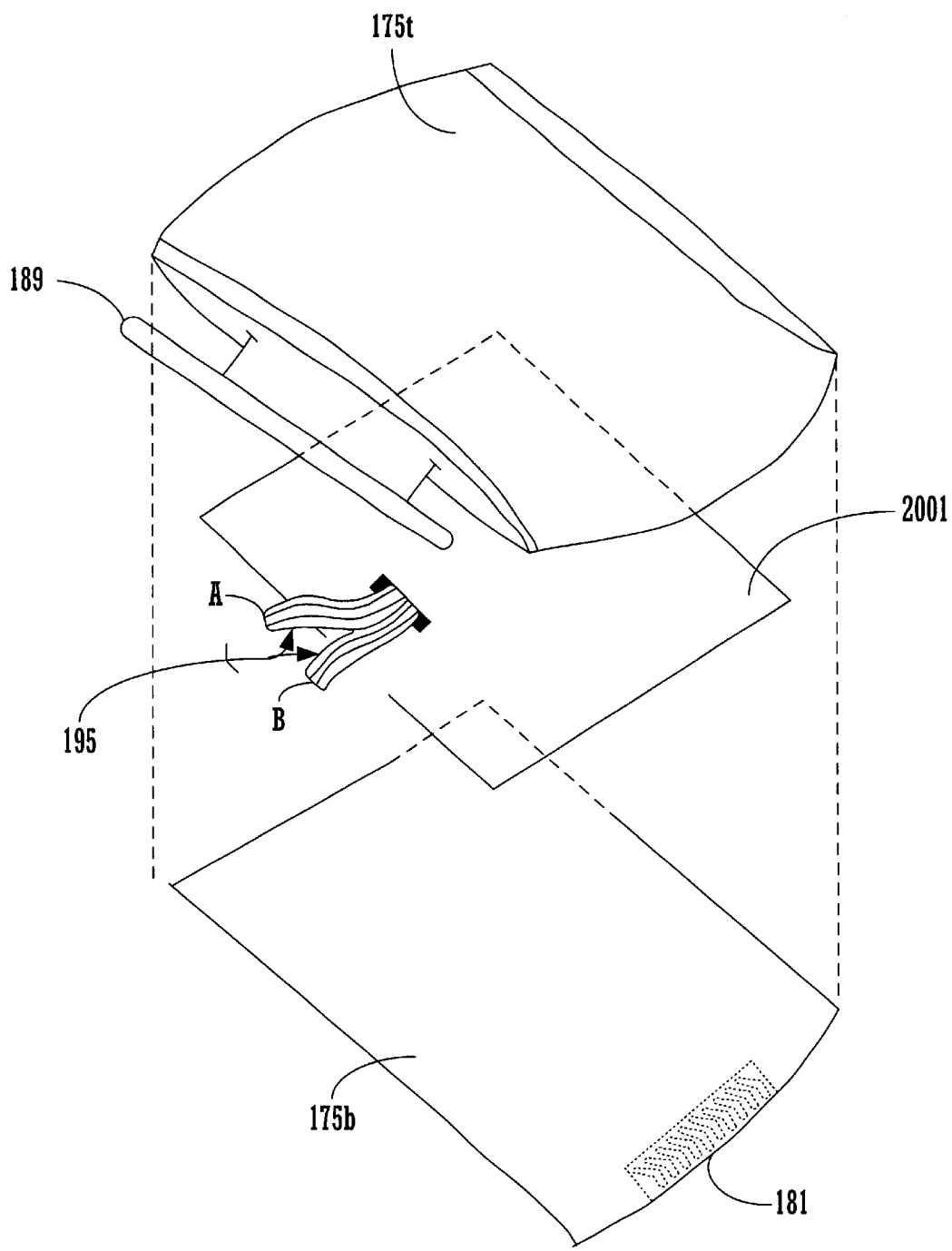
FIG. 6 is an illustrated exploded view of the present invention integrated with the front flip cover, in accordance with one embodiment of the present invention.

FIG. 6 is an illustrated exploded view of hinged front flip cover 175, which is communicatively coupled and hingeably attached with portable computer 100, in one embodiment of the present invention. It should be appreciated that portable computer system 100 as depicted in FIGS. 4 and 5 is not shown so as to simplify the description of the exploded view of front flip cover 175. Front flip cover 175 consists of top half 175T and bottom half 175B, which serve to encase, insulate, and protect flat renewable energy source 2001. In this embodiment of the present invention, top half 175T and bottom half 175B of front flip cover 175 are configured such that they are sealed together. Renewable energy source or battery 2001 may be a rechargeable battery.

Still referring to FIG. 6, renewable energy source 2001 provides the power needed to operate portable computer system 100. Hinge interface connector 189 is shown and is adapted to be inserted into front flip cover receiving slot 190 and configured to be coupled with hinge interface connector 191 of portable computer system 100. Hinge interface connector 189 enables communicative coupling with portable computer system 100. Flexible electrical connector 195, in this embodiment, has two connector portions, 195A and 195B, respectively. Connector portion 195A provides the electrical and communicative connection between renewable energy source 2001 and hinge interface connector 189. Connector portion 195B provides the electrical and communicative connection between renewable energy source 2001 and cradle interface connector 181. In another embodiment, renewable energy source 2001 may be configured with a non-flexible connector. Cradle interface connector 181 is adapted to be coupled to docking cradle 195 (FIGS. 9 and 10) so as to provide synchronization and recharge functionality.

Figure 7:
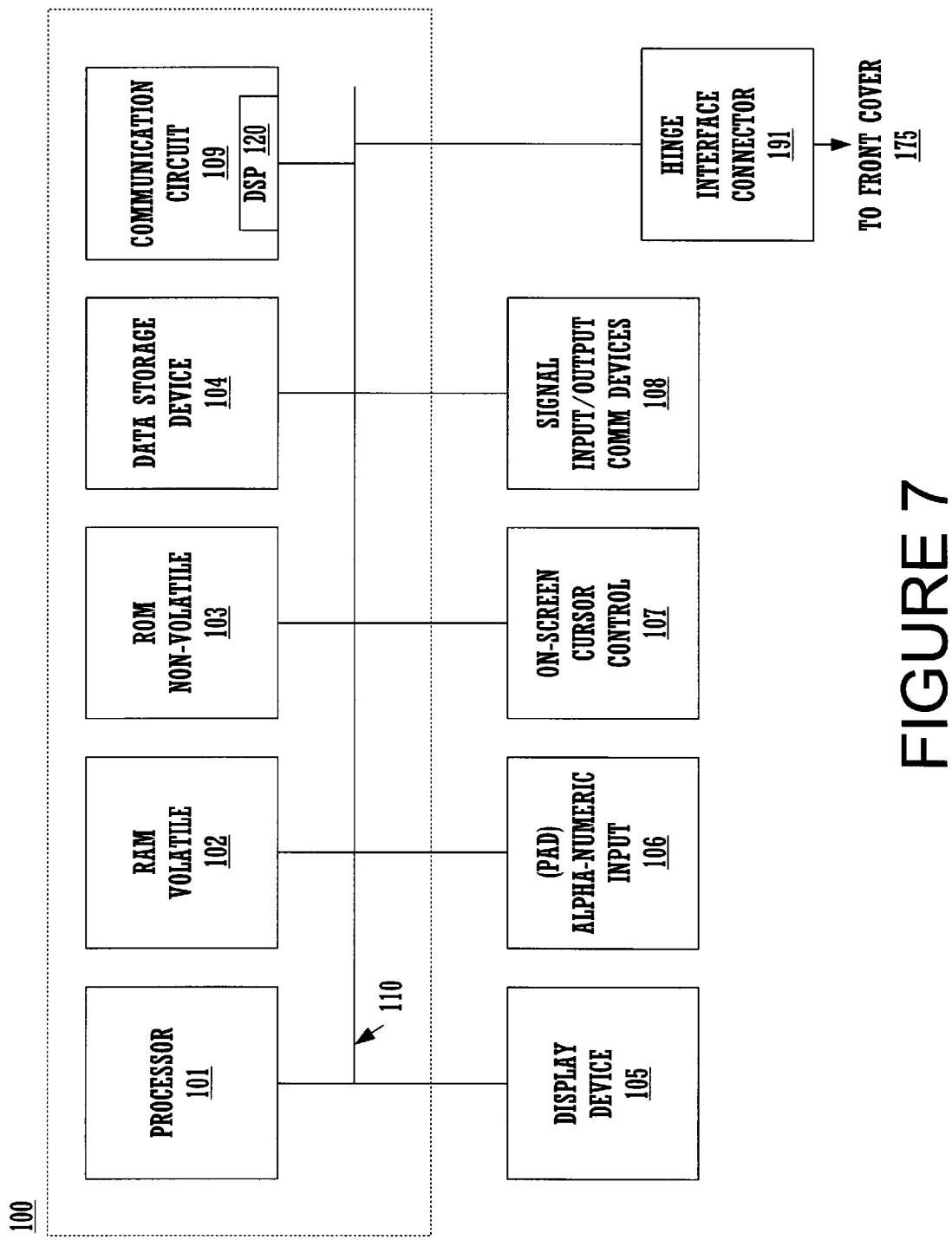
FIG. 7 is an illustrated block diagram of the circuitry and components disposed within a portable computer system, in accordance with one embodiment of the present invention.

FIG. 7 is a functional block diagram of portable computer system 100, which can be implemented on a PC board, in one embodiment of the present invention. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., secure digital card, multimedia card or a memory stick) coupled with the bus 110 for storing information and instructions. Device 104 can be removable. As described above, computer system 100 also contains a display device 105 coupled to the bus 110 for displaying information to the computer user. A PC board can contain the processor 101, the bus 110, the ROM 103 and the RAM 102.

With reference still to FIG. 7, computer system 100 also includes a signal transmitter/receiver device 108, which is coupled to bus 110 for providing a physical communication link between computer system 100, and a network environment. As such, signal transmitter/receiver device 108 enables central processor unit 101 to communicate wirelessly with other electronic systems coupled to the network. It should be appreciated that within the present embodiment, signal transmitter/receiver device 108 is coupled to an antenna and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 7 is an optional alphanumeric input device 106 that in one implementation is a handwriting recognition pad ("digitizer"), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Still referring to FIG. 7, portable computer system also includes hinge interface connector 191, which provides electrical and communicative coupling with front flip cover 175, in which is disposed the present invention. In another embodiment of the present invention, hinge interface connector may be a discrete connector. In another embodiment, hinge interface connector may be discrete cable or plug.

Figure 8:
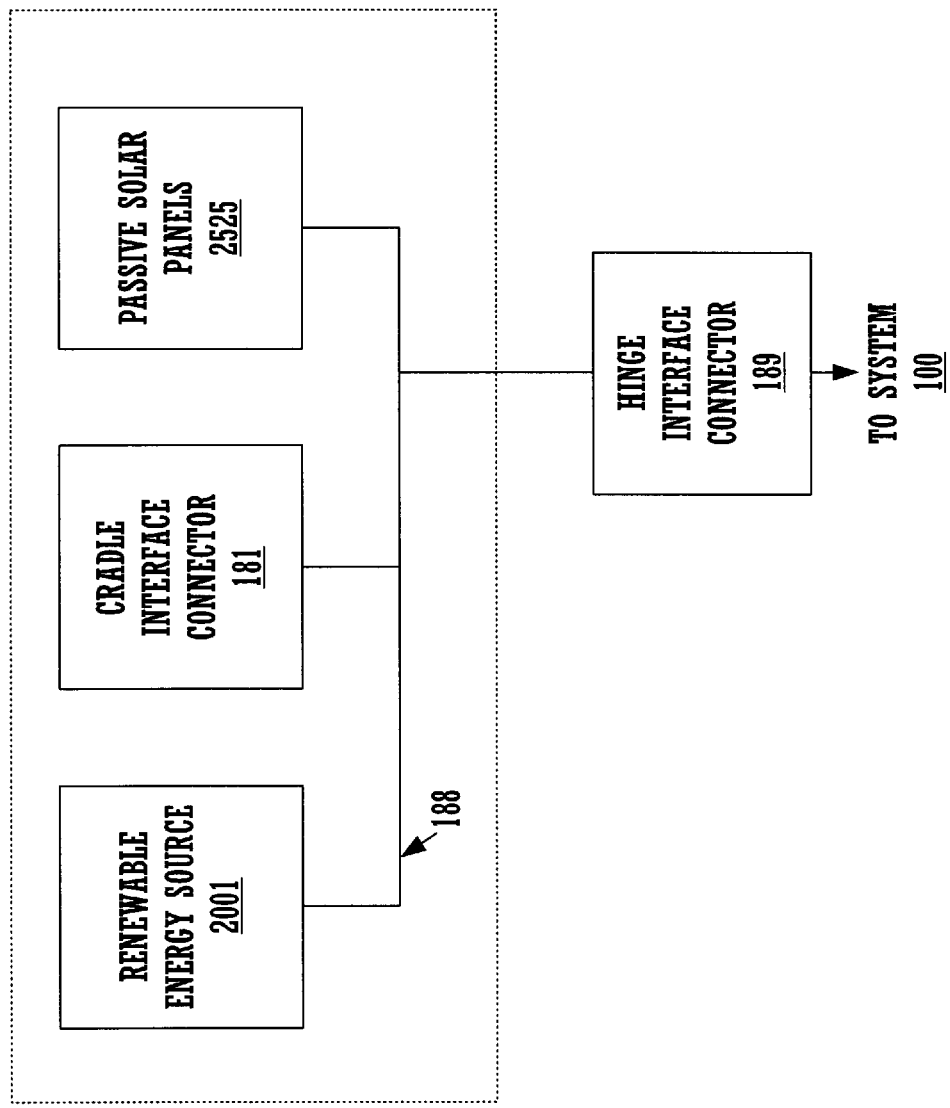
FIG. 8 is an illustrated block diagram of the circuitry and components disposed within the front flip cover inserted into the portable computer system of FIG. 7, in accordance with one embodiment of the present invention.

FIG. 8 is a functional block diagram of front flip cover 175 of portable computer system 100, in which the present invention is disposed, in one embodiment of the present invention. Front flip cover 175 includes a bus 188 which provides communication and power lines for the components of front flip cover 175 to interact with the portable computer system to which it is coupled. Front flip cover 175 also includes cradle interface connector 181 which enables front flip cover 175 to be communicatively and electrically coupled to a docking cradle 195 (FIGS. 9 and 10) thereby providing hot synching and recharging functionality to portable computer system 100. Also included in front flip cover 175 is flat renewable energy source 2001 which provides the power with which portable computer system 100 operates. Hinge interface connector 189 is also shown. Hinge interface connector 189 provides communicative and electrical coupling of front flip cover 176 with portable computer system 100 when inserted into front flip cover receiving slot 190 and is therefore coupled with hinge interface connector 191 of portable computer system 100.

Figure 13:
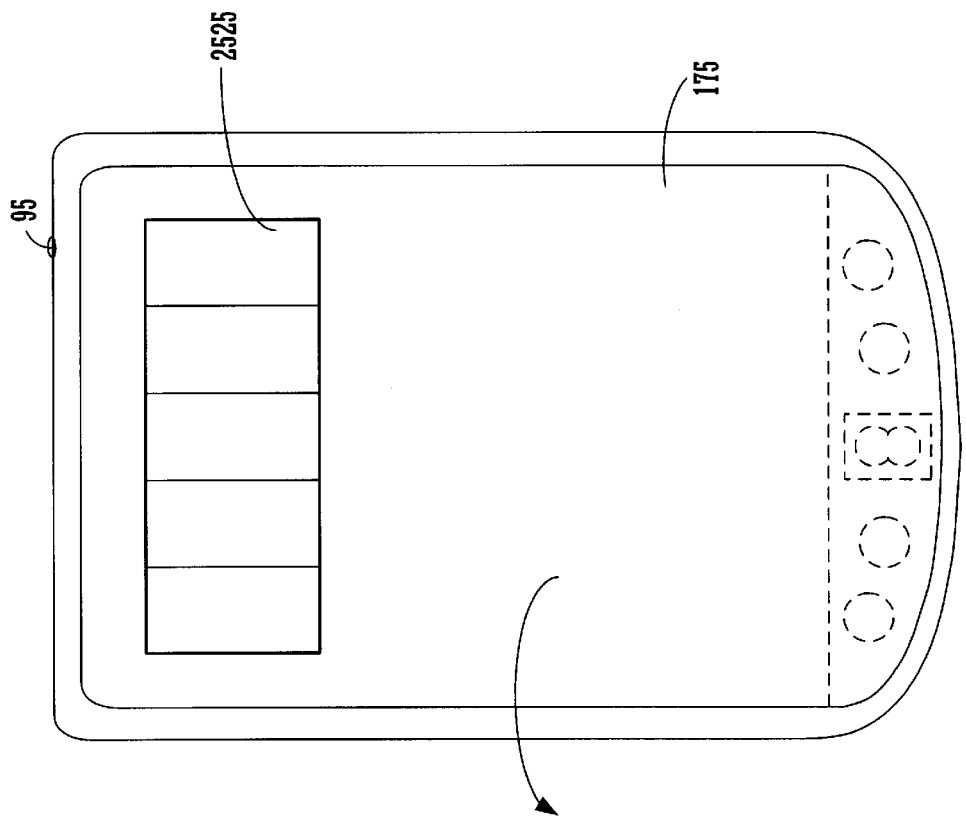
FIG. 13 is an illustrated front facing view of a portable computer system having a front flip cover, showing the front flip cover in a closed position and a passive solar panel disposed on the outer surface of the front flip cover, in accordance with one embodiment of the present invention.

It should be appreciated that in the context of the present embodiment of the present invention, front flip cover 175 is configured with a renewable energy source that is rechargeable through the utilization of a docking cradle 195 (FIGS. 9 and 10). However, in another embodiment of the present invention, optional passive solar panel 2525 may be included upon front flip cover 175, as shown in FIG. 13. As such, passive solar panel 2525, by providing an additional mechanical apparatus for supplying an energy source, reduces the frequency and duration of recharging needed by the renewable energy source.

FIG. 9 shows illustrated front angled views of a docking cradle 195 and a portable computer system 100 configured with a front flip cover 175 wherein the present invention is disposed, in one embodiment of the present invention. Cable 198, in one embodiment, provides the electrical and communicative link between docking cradle 195 and a computer to which it is coupled. Cable 198 enables battery recharging and synchronization with other computers. In this illustration, front flip cover 175 is folded back. In this orientation, when portable computer system 100 is inserted into docking cradle 195, cradle interface connector 181 of front flip cover 175 will be connected to cradle interface connector 197, and as such synchronization, via hot synch button 196 and automatic recharging of the renewable energy source are enabled.

FIG. 10 shows illustrated front angled views of a docking cradle 195 and a front flip cover 175, analogous to the illustrations in FIG. 9, in one embodiment of the present invention. However, in this illustration, front flip cover 175 is not coupled with portable computer system 100. As such, hinge interface connector 189 is visible. It should be appreciated that the present invention enables the renewable energy source 2001 disposed within front flip cover 175 to be recharged, whether front flip cover 175 is coupled or not coupled with portable computer system 100. As such, in one example, a user could acquire multiple front flip covers and would then be able to recharge one front flip cover 175 while utilizing another to power their portable computer system 100. In this fashion, a user would almost never have down time while waiting for the recharging of the renewable energy source to finish.

Still referring to FIG. 10, it should also be appreciated that in this example, because front flip cover 175 is not coupled with portable computer system 100, synchronization is not possible, as the data storage is contained within the computer system, not the front flip cover. It should also be appreciated that in another embodiment, front flip cover 175 could be configured with data storage capabilities, such that synchronization could be possible, whether or not front flip cover 175 is coupled to portable computer system 100.

It should further be appreciated that by virtue of the expanded physical area with which the renewable energy source may be disposed, a greater volume of energy can be stored, and as such more power is now available to the portable computer system and a reduction in the frequency of recharging is achieved. It should be further appreciated that by virtue of the relocation of the battery from the portable computer system of the front flip cover, a substantial reduction of required thickness of the computer system is also achieved.

Figure 11:
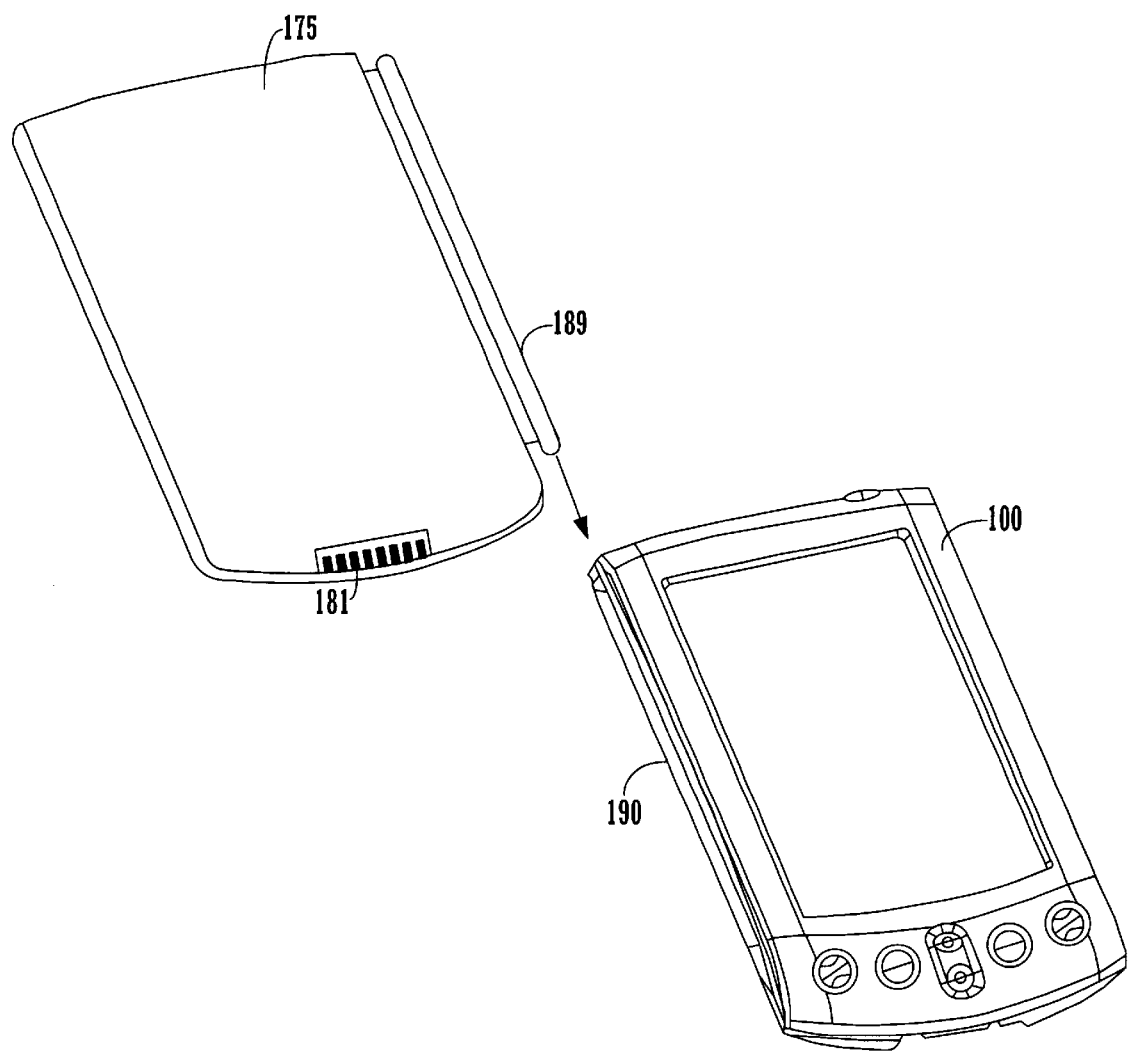
FIG. 11 is an illustrated front angled view of a portable computer system configured with side hinge receiving functionality and a front flip cover, wherein the front flip cover hinge is to be inserted into the portable computer system, in accordance with one embodiment of the present invention.

FIG. 11 is an illustrated front angled view of a portable computer system 100 and a front flip cover 175, in one embodiment of the present invention. In this illustration, hinge interface connector 189 of front flip cover 175 is insertable into front flip cover hinge receiving slot 190, as indicated by the arrow. In this embodiment, front flip cover receiving hinge 190 is disposed upon one of the side edge surfaces of the portable computer system. In another embodiment, front flip cover receiving slot 190 could be disposed upon the opposite side edge surface.

Figure 12:
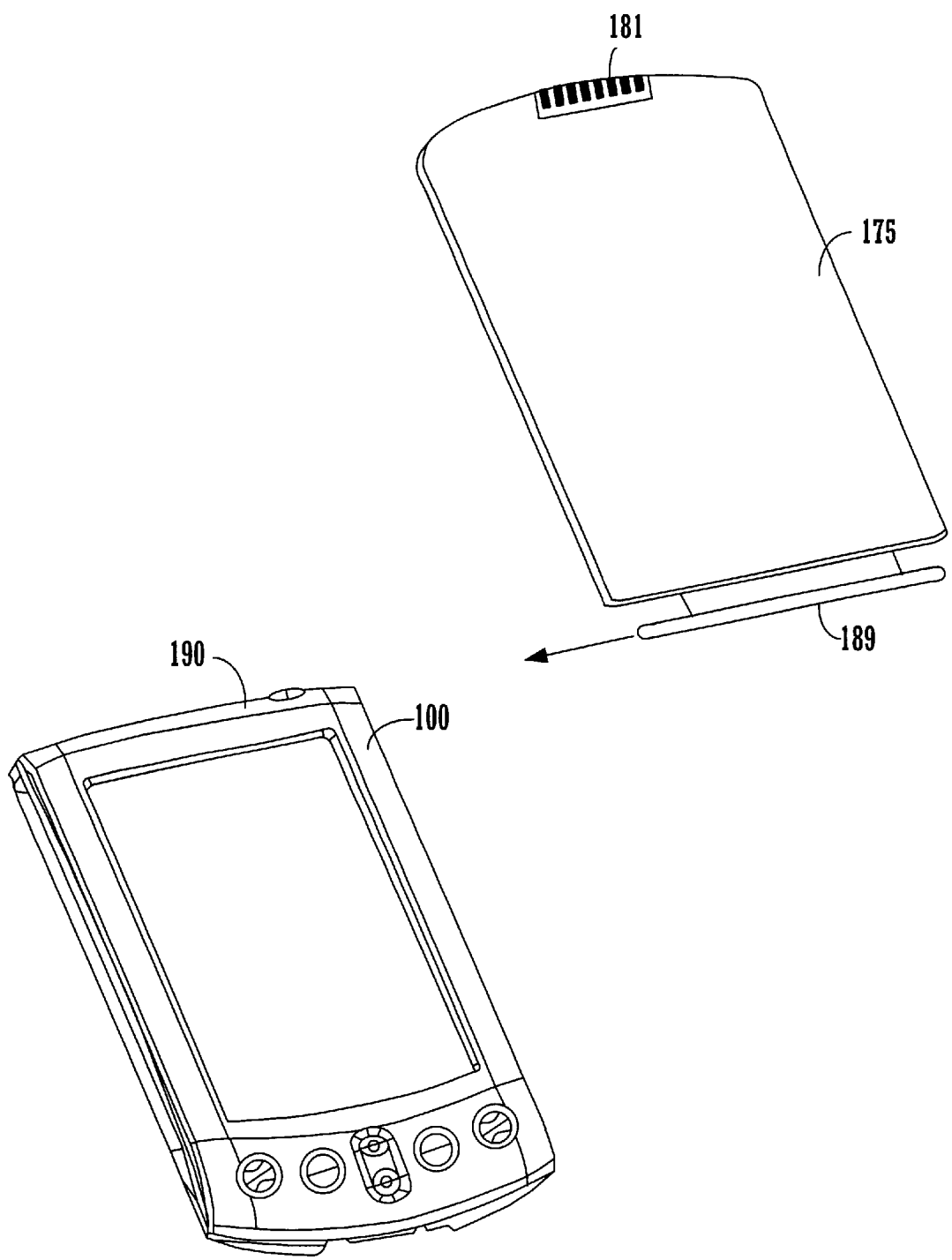
FIG. 12 is an illustrated front angled view of a portable computer system configured with top hinge receiving functionality and a front flip cover, wherein the front flip cover is to be inserted into the portable computer system, in accordance with one embodiment of the present invention.

FIG. 12 is an illustrated front angled view of a portable computer system 100 and a front flip cover 175, in another embodiment of the present invention. In this illustration, hinge interface connector 189 of front flip cover 175 is insertable into front flip cover hinge receiving slot 190, as indicated by the arrow. In this embodiment, front flip cover receiving hinge 190 is disposed upon the top edge surface of the portable computer system. In another embodiment, front flip cover receiving slot 190 could be disposed upon the bottom edge surface.

FIG. 13 is an illustrated front facing view of portable computer system 100 equipped with a front flip cover 175, in one embodiment of the present invention. FIG. 13 is analogous to FIG. 4 except in FIG. 13, disposed upon top half 175T of front flip cover 175 is optional passive solar panel 2525. Optional passive solar panel 2525 provides an additional apparatus which also is able to recharge the renewable energy source contained therein. As such, a reduction in the frequency of recharging is therefore achieved.

It should be appreciated that, in another embodiment, a keyboard may be disposed upon bottom half 175B of front flip cover 175. In yet another embodiment, a game controlling apparatus may be disposed upon bottom half 175B of front flip cover 175. It should be further appreciated that by virtue of the ease with which front flip cover 175 be inserted and/or removed from portable computer system 100, an almost endless combination of applications may be implemented upon front flip cover 175.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A removable flip cover for a portable computer system, said flip cover comprising;
    a battery, said battery being rechargeable, flat and substantially planar;
    a hinge adapted to be inserted into a receiving slot of said portable computer system, said hinge attached to an edge of said battery; and
    an electrical connector mounted on a'surface of said hinge and electrically connected to said battery, said electrical connector for providing power to said portable computer system when said removable flip cover is removably attached thereto.

2. A removable flip cover as described in claim 1 further comprising a cover material surrounding said battery and a second electrical connector mounted on a surface of said cover material, said second electrical connector for mating with a receiving connector of a cradle for recharging said battery.

3. A removable flip cover as described in claim 2 wherein said second electrical connector and said first electrical connector are electrically coupled.

4. A removable flip cover as described in claim 2 further comprising solar cells for recharging said battery.

5. A removable flip cover as described in claim 1 wherein said hinge allows said removable flip cover to swing between open and closed positions.

6. A removable front flip cover adapted to be electrically and mechanically coupled to a portable computer system, said removable front flip cover comprising:
    a hinge;
    a first electrical connector coupled to said hinge of said front flip cover; and
    a flat energy source, said flat energy source disposed within said removable front flip cover and integral with said removable front flip cover, said flat energy source operable to provide operating power to said portable computer system, wherein said hinge and said electrical connector are operable to provide a charge pathway for said flat energy source.

7. The removable front flip cover of claim 6 wherein said hinge is adapted to open and close said front flip cover.

8. The removable front flip cover of claim 6 wherein said first electrical connector is adapted to provide electrical connectivity and communicative coupling between said portable computer system and said front flip cover.

9. The removable front flip cover of claim 6 further comprising a second electrical connector disposed upon the inside surface of said flip cover.

10. The removable front flip cover of claim 9 wherein said second electrical connector of said front flip cover is adapted to provide electrical connectivity and communicative coupling between said front flip cover and a cradle, said cradle having an electrical connector adapted to be coupled with said second electrical connector of said front flip cover.

11. The removable front flip cover of claim 9 wherein said flat energy source is coupled with said first electrical connector and said second electrical connector.

12. The removable front flip cover of claim 6 wherein said portable computer system and said front flip cover are adapted to be inserted into a cradle.

13. The removable front flip cover of claim 6 wherein said flat energy source is adapted to be recharged when said front flip cover is inserted into a cradle.

14. The removable front flip cover of claim 6 wherein said flat energy source is adapted to be recharged when said front flip cover is inserted into and therefore coupled with said portable computer system, provided said portable computer system is inserted into a cradle.

15. The removable front flip cover of claim 6 wherein said front flip cover is further comprising a passive solar panel, said passive solar panel disposed on an outer surface of said front flip cover, said outer surface the surface visible when said front flip cover is closed, so as to provide additional recharging functionality to said front flip cover.

16. The removable front flip cover of claim 6 wherein said front flip cover is further comprised of a keyboard, said keyboard coupled with said portable computer system when said front flip cover is coupled with said portable computer system, said keyboard disposed upon an inside surface of said front flip cover.

17. A system comprising a portable computer system and a removable front flip cover for providing rechargeable power to said portable computer system, said front flip cover operable to be removably attached to said portable computer system, said removable front flip cover comprising:

a hinge;

a first electrical connector coupled with said hinge of said front flip cover and for supplying power to said portable computer system; and a flat energy source coupled with said hinge and for providing operating power to said portable computer system, through said first electrical connector provided said hinge is attached thereto.

18. The system of claim 17 wherein said hinge of said front flip cover is adapted to open and close said front flip cover.

19. The system of claim 17 wherein said first electrical connector is adapted to provide electrical connectivity and communicative coupling between said portable computer system and said front flip cover.

20. The system of claim 17 further comprising a second electrical connector coupled to said front flip cover and is disposed upon the inside surface of said front flip cover.

21. The system of claim 20 wherein said second electrical connector coupled with said front flip cover is adapted to provide electrical connectivity and communicative coupling between said front flip cover and a docking cradle, said docking cradle having an electrical connector adapted to be coupled with said second electrical connector of said front flip cover.

22. The system of claim 21 herein said flat energy source is adapted to be recharged when said front flip cover is inserted into a docking cradle.

23. The system of claim 21 wherein said flat energy source is adapted to be recharged when said front flip cover is coupled with said portable computer system, provided said portable computer system is inserted into a docking cradle.

24. The system of claim 20 wherein said flat energy source is coupled with first electrical connector and said second electrical connector, said flat energy source rechargeable.

25. The system of claim 17 wherein said front flip cover and said portable computer system are adapted to be inserted into a docking cradle.

26. The system of claim 17 wherein said front flip cover further comprises a passive solar panel, said passive solar panel disposed on an outer surface of said front flip cover, said outer surface visible when said front flip cover is closed, said passive solar panel providing additional recharging functionality to said front flip cover.

27. The system of claim 17 wherein said front flip cover further comprises a keyboard, said keyboard communicatively coupled with said portable computer system when said front flip cover coupled with said portable computer system, said keyboard disposed upon an inside surface of said front flip cover.

28. A method for providing energy to a portable computer system, said method comprising:

a) inserting a removable flip cover into a receiving slot of said portable computer system, said removable flip cover comprising a flat rechargeable battery and a hinge, said hinge operable to be inserted into said slot; and b) said flat rechargeable battery providing said energy to said portable computer system through said hinge, wherein said removable flip cover also functions to provide protection to a display screen of said portable computer system when closed.

29. A method as described in claim 28 further comprising the step of recharging said flat rechargeable battery by inserting said portable computer system and attached flip cover into a cradle, wherein said cradle comprises a receiving socket or connector attached to said flip cover and wherein said connector being connected to said flat rechargeable battery.

30. The method as recited in claim 28 wherein said hinge is adapted to be removably coupled with said portable computer system.

31. The method as recited in claim 28 wherein said connector coupled with said front flip cover is disposed upon the inside surface of said front flip cover.

32. The method as recited in claim 28 wherein said flat rechargeable battery is adapted to be recharged when said front flip cover is coupled with said portable computer system and when said front flip cover is removed from said portable computer system, provided said front flip cover is coupled with said docking cradle.

* * * * *

UNITED STATES PATENT AND TRADEMARK OFFICE
CERTIFICATE OF CORRECTION

PATENT NO.    : 6,630,811 B1                                           Page 1 of 1
DATED         : October 7, 2003
INVENTOR(S)   : Rich Gioscia It is certified that error appears in the above-identified patent and that said Letters Patent is hereby corrected as shown below:

<u>Title page,</u>
Item [22], should read:
-- [22]  Filed:   Mar. 21, 2001 --

Signed and Sealed this

Twentieth Day of January, 2004

JON W. DUDAS
*Acting Director of the United States Patent and Trademark Office*